April 21, 1964     R. D. CONNELLY     3,129,775
ICE AUGER
Filed Feb. 9, 1962                            2 Sheets-Sheet 1
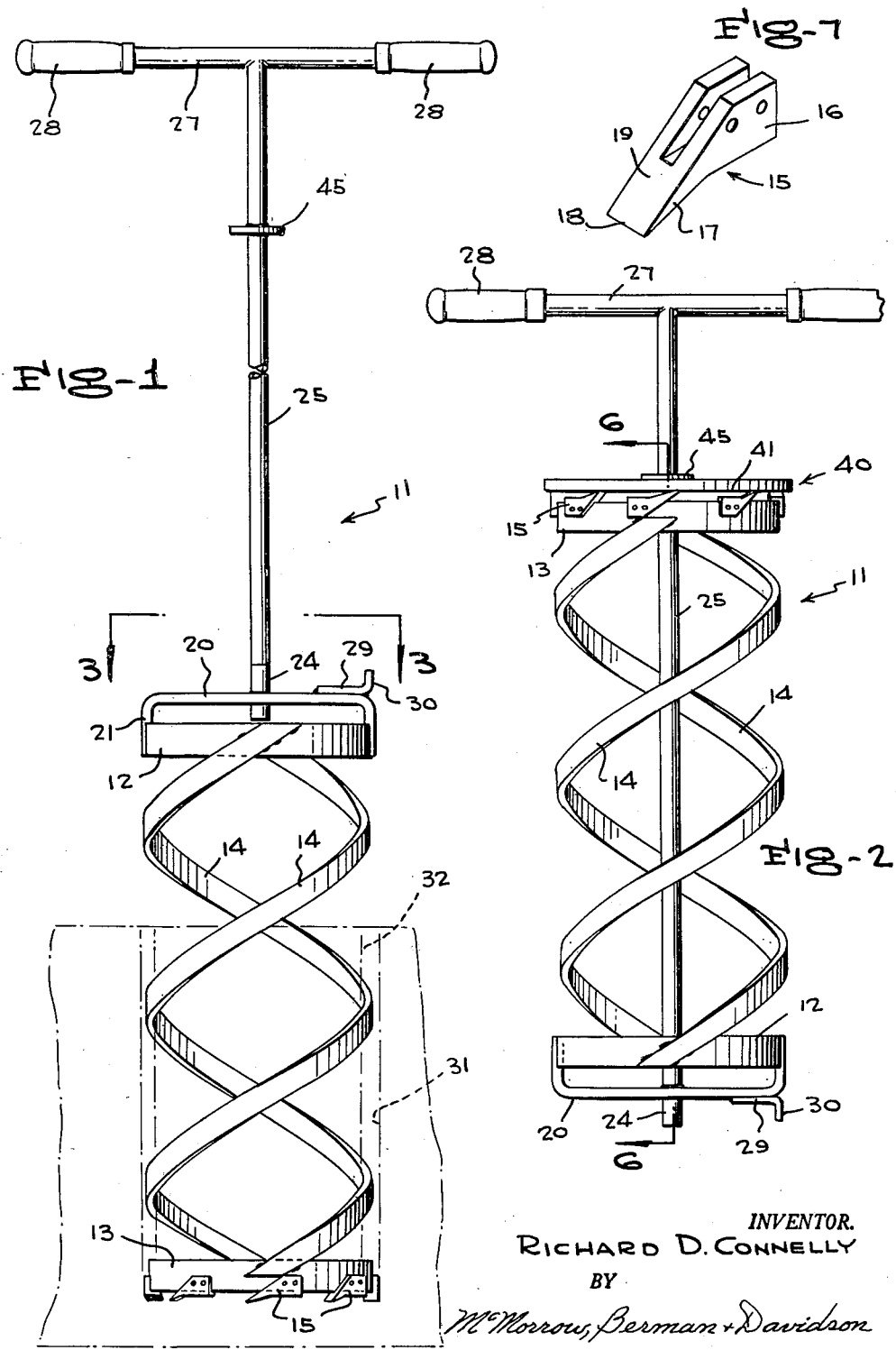
INVENTOR.
RICHARD D. CONNELLY
BY
McMorrow, Berman + Davidson
ATTORNEYS

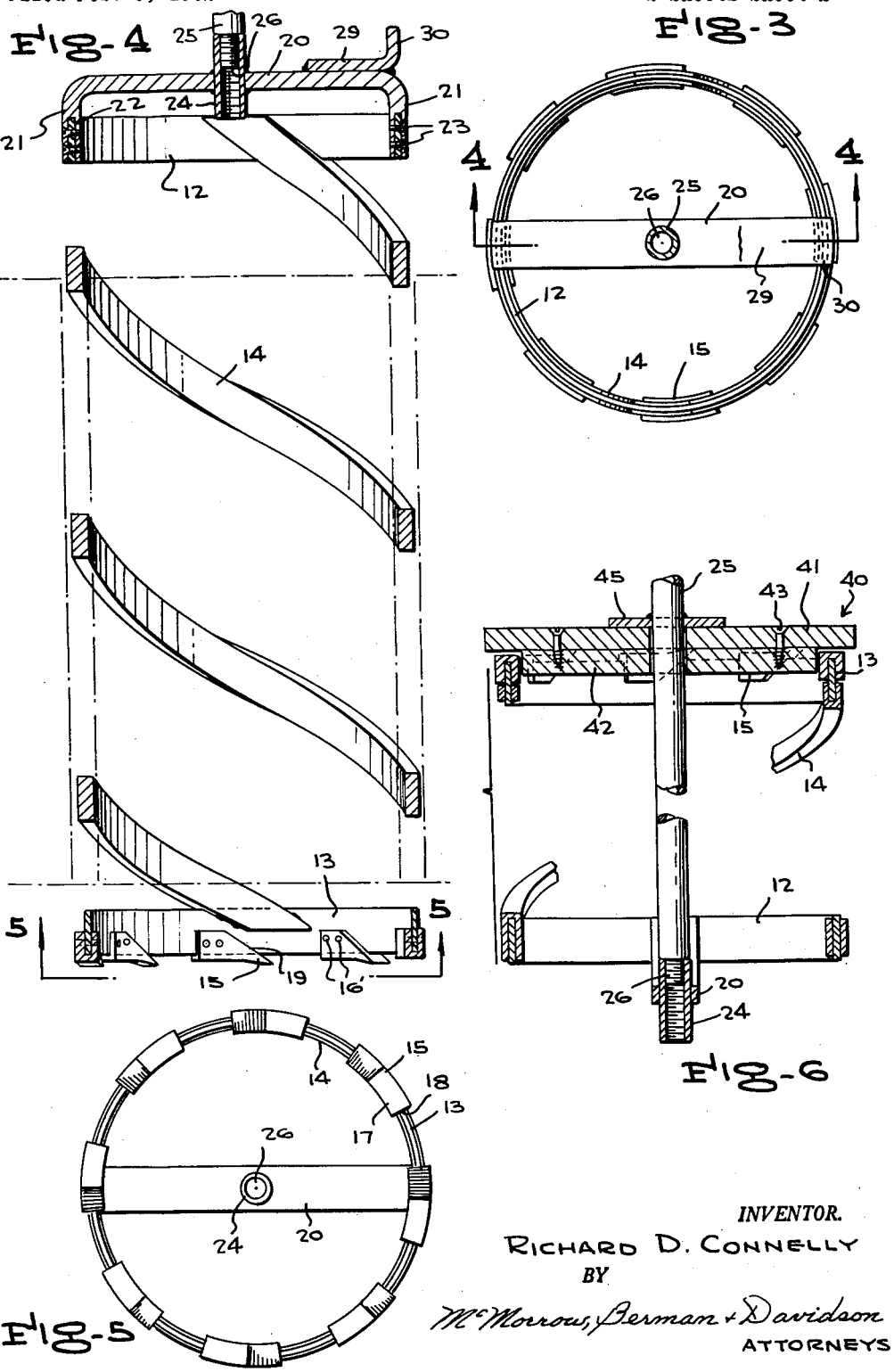

United States Patent Office 3,129,775
Patented Apr. 21, 1964

3,129,775
ICE AUGER
Richard D. Connelly, R.F.D. 2, Graceville, Minn.
Filed Feb. 9, 1962, Ser. No. 172,259
4 Claims. (Cl. 175—18)

This invention relates to augers, and more particularly to a core drill for use in cutting holes through ice for the purpose of fishing.

A main object of the invention is to provide a novel and improved ice auger for use in boring fishing holes in ice, the auger being relatively simple in construction, being easy to operate, and providing a means for cutting a cylindrical block or core from the ice without the necessity of crushing the ice during the cutting operation.

A further object of the invention is to provide an improved auger device for cutting a hole through ice for the purpose of fishing, the auger device being relatively inexpensive to fabricate, being sturdy in construction, providing a rapid cutting action, being self-cleaning, and being adapted to be easily disassembled and arranged for safe transportation or storage.

Further objects and advantages of the invention will become more apparent from the following description and claims, and from the accompanying drawings, wherein:

FIGURE 1 is an elevational view of an improved ice auger constructed in accordance with the present invention.

FIGURE 2 is an elevational view of the ice auger of FIGURE 1, shown arranged for transportation or storage.

FIGURE 3 is an enlarged horizontal cross sectional view taken substantially on the line 3—3 of FIGURE 1.

FIGURE 4 is a fragmentary vertical cross sectional view taken substantially on the line 4—4 of FIGURE 3.

FIGURE 5 is a bottom plan view of the ice auger taken substantially on the line 5—5 of FIGURE 4.

FIGURE 6 is an enlarged fragmentary vertical cross sectional view taken substantially on the line 6—6 of FIGURE 2.

FIGURE 7 is an enlarged perspective view showing one of the cutting teeth employed on the circular lower ring member of the ice auger illustrated in FIGURE 1.

Referring to the drawings, 11 generally designates an improved ice auger constructed in accordance with the present invention. The auger 11 comprises a circular rigid top ring 12, a circular rigid bottom ring 13 of identical diameter with the top ring 12, and a pair of opposing helical bar members 14, 14 of identical shape arranged oppositely and secured respectively at their top and bottom ends to the upper ring member 12 and to the lower ring member 13, as is clearly shown in FIGURE 1. As is further illustrated in FIGURE 4, the helical bar members 14 are substantially identical in diameter with the ring members 12 and 13, the bar members 14 being of rectangular transverse cross sectional shape and being formed with a relatively wide pitch, whereby each bar member 14 consists of approximately one and one-half turns. The helical rod members 14 are rigid and of substantially constant diameter. As previously mentioned, the diameter of the helical rod members 14 is substantially identical to that of the top and bottom ring members 12 and 13.

Secured to the bottom edge of the lower ring member 13 are a plurality of evenly spaced depending downwardly inclined cutting teeth 15, each tooth comprising a main body 16 which is substantially U-shaped in cross section and which snugly receives the lower marginal portion of the bottom ring member 13 and is rigidly secured thereto by a pair of transversely extending rivets 16', 16', or other suitable bolt means. The body 16 is formed with the downwardly inclined forward tapered tooth portion 17 which terminates in a transversely extending sharp cutting edge 18.

As will be apparent from FIGURE 4, the sloping top edge 19 of each tooth member 15 is substantially parallel to the lower edges of the helical bar members 14, in other words, the angle of inclination of said top surface 19 is substantially the same as the pitch angle of the helical bar members 14, 14.

Designated at 20 is a generally U-shaped transversely extending bracket member or bar which is rigidly secured diametrically to the top ring member 12. Thus, the depending arms 21, 21 of the U-shaped bracket member 20 are formed with vertical slots 22 receiving diametrically opposite portions of the ring member 12 and are fastened to said diametrically opposite portions by respective pairs of fastening screws 23, 23 extending therethrough. The screws 23 extend through the outer wall elements of the slots 22 and through the ring members 12, being threadedly engaged in the inner wall elements of said slots.

Rigidly secured to the intermediate portion of the bracket member 20 and extending perpendicularly thereto is an internally threaded sleeve member 24. Designated at 25 is a tubular rod member in one end of which is rigidly secured an externally threaded stud member 26 which is threadedly engageable in the sleeve member 24. Rigidly secured to the opposite end of the tubular rod member 25 is a handle bar 27 extending perpendicular to the rod member 24 and provided at its opposite ends with respective rubber handle grips 28, 28. As shown in FIGURE 1, the ice auger, when it is fully assembled, comprises the tubular rod member 25 threadedly connected to the bracket bar 20 by being tightly engaged in the sleeve member 24.

Designated at 29 is a generally L-shaped kick bracket which is rigidly secured to one end portion of the bracket bar 20 and thus provides the upwardly projecting vertical arm 30 at the outer end of the bracket bar 20.

In using the auger, it is rotated on the ice with the teeth 15 in engagement therewith, so that the teeth cut a circular pattern on the ice. With the auger continuously rotated in the same direction, the teeth 15 dig more deeply into the ice, so that eventually continued rotation of the auger produces the annular cavity, shown at 31 in dotted view, in the ice. The loosened chips are forced upwardly along the top edges of the helical bar members 14, 14, being thus conveyed to the surface as the boring action continues. When the auger has been worked downwardly to a substantial depth, the core, shown at 32 in dotted view in FIGURE 1, may be removed by kicking the bracket member 29, namely, by delivering an impact against the upstanding arm 30, whereby to loosen the core 32 and allow it to be elevated out of the hole formed by the auger. After the core portion 32 has been removed, the boring action may be resumed, allowing continued downward penetration of the device without interference with a core. Thus, the auger may be employed to cut through ice of considerable depth, by repeatedly removing core segments formed by the rotation of the auger and then continuing to work the auger deeper into the ice.

Eventually, the auger will penetrate completely through the thickness of the ice. When this is done, the core may be removed by removing the auger from the hole, and then the auger may be put back into the hole in contact with the water and pulled out quickly, so that the swirling action of the water caused by the engagement therewith of the spiral bar members 14 will clear the hole of any remaining ice chips.

The auger 11 may be disassembled for transportation and storage, to reduce its bulk and to provide protection for the cutting teeth 15, by unscrewing the tubular rod member 25 from the sleeve 24 and inverting the body of the auger to place the ring member 12 lowermost, as shown in FIGURE 2. A tooth protective disc assembly, shown generally at 40, is provided, said assembly comprising a top disc 41 and a smaller bottom disc 42 secured to the top disc, for example, by wood screws 43, as shown in FIGURE 6. The assembly 40 is centrally apertured to receive the tubular rod member 25, and the lower disc member 42 is slightly smaller in diameter than the inside diameter of the ring member 13 so that it will engage therein, as shown in FIGURE 6, with the larger upper disc member overlying the cutting teeth 15. The disc members 41 and 42 are made of relatively yieldable material, such as plywood, or the like, so that they will not damage the cutting edges 18 by contact therewith. A stop collar 45 is rigidly secured on the upper portion of the tubular rod member 25 to limit the disc assembly 40 to the position thereof illustrated in FIGURES 2 and 6. The stud element 26 is threadedly engaged in the sleeve member 24, as is clearly shown in FIGURE 6, and the stud 26 is screwed tightly into the sleeve 24 to cause the stop collar 45 to engage the top disc member 41 and hold the elements in a substantially rigidly secured position. The stop collar 45 is preferably located on the rod member 25 so that when the stud 26 is tightly engaged in the sleeve 24 the stop collar will cause the top disc 41 of the protective assembly 40 to engage the pointed ends of the teeth 15 with merely sufficient pressure to cause the teeth to penetrate slightly into the yieldable material of the disc 41 and to thereby exert a binding action to prevent rattling or looseness of the parts when the device is being transported. As shown in FIGURE 2, the handle bars 27 may be employed to carry the device in its inoperative, folded-up condition.

While a specific embodiment of an improved ice auger has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An ice auger comprising a top ring, a bottom ring, a plurality of helical bar members rigidly connecting said top ring in coaxial spaced relation to said bottom ring, a plurality of depending downwardly inclined cutting teeth secured to said bottom ring, each of said cutting teeth comprising a substantially U-shaped main body which snugly receives and is rigidly secured to the lower marginal portion of the bottom ring, and which is formed with a downwardly inclined tapered tooth portion which terminates in a transversely extending straight cutting edge, a bracket member rigidly secured to said top ring and extending transversely thereacross, a rod member secured at its bottom end centrally to said bracket member and arranged coaxially with said top and bottom rings, and a transverse handle bar secured rigidly to the top end of said rod member.

2. An ice auger comprising a top ring, a bottom ring, a plurality of rigid helical bar members rigidly connecting said top ring in coaxial spaced relation to said bottom ring, said bottom ring, said top ring, and said helical bar members being substantially the same in diameter, a plurality of depending downwardly inclined cutting teeth secured to said bottom ring, each of said cutting teeth comprising a substantially U-shaped main body which snugly receives and is rigidly secured to the lower marginal portion of the bottom ring, and which is formed with a downwardly inclined tapered tooth portion which terminates in a transversely extending straight cutting edge, a cross bar rigidly secured to said top ring and extending transversely thereacross, a rod member secured at its bottom end centrally to said cross bar and arranged coaxially with said top and bottom rings, and a transverse handle bar secured rigidly to the top end of said rod member.

3. An ice auger comprising a top ring, a bottom ring, a plurality of helical bar members rigidly connecting said top ring in coaxial spaced relation to said bottom ring, said bottom ring, top ring, and helical bar members being substantially the same in diameter, a plurality of downwardly inclined cutting teeth secured to said bottom ring, each of said cutting teeth comprising a substantially U-shaped main body which snugly receives and is rigidly secured to the lower marginal portion of the bottom ring, and which is formed with a downwardly inclined tapered tooth portion which terminates in a transversely extending straight cutting edge, a cross bar rigidly secured to said top ring and extending transversely thereacross, and internally threaded sleeve member rigidly secured centrally to said cross bar and extending perpendicularly thereto and arranged coaxially with said top and bottom rings, and a transverse handle bar secured rigidly to the top end of said rod member.

4. An ice auger comprising a top ring, a bottom ring, a plurality of helical bar members rigidly connecting said top ring in coaxial spaced relation to said bottom ring, said top ring, bottom ring and helical bar members being substantially the same in diameter, a plurality of depending downwardly inclined cutting teeth secured to said bottom ring, each of said cutting teeth comprising a substantially U-shaped main body which snugly receives and is rigidly secured to the lower marginal portion of the bottom ring, and which is formed with a downwardly inclined tapered tooth portion which terminates in a transversely extending straight cutting edge, a cross bar rigidly secured to said top ring and extending transversely thereacross, an internally threaded sleeve member rigidly secured centrally to said cross bar and extending perpendicularly thereto, a rod member threadedly secured at its bottom end centrally in said sleeve member and arranged coaxially with said top and bottom rings, a transverse handle bar secured rigidly to the top end of said rod member, and an upwardly projecting kick bracket secured on one end of said cross bar.

References Cited in the file of this patent

UNITED STATES PATENTS

| 1,209,058 | Smith | Dec. 19, 1916 |
| 1,456,153 | Seeger | May 22, 1923 |
| 1,658,963 | Bergquist | Feb. 14, 1928 |
| 2,014,311 | Council | Sept. 10, 1935 |
| 2,666,623 | Johnson | Jan. 19, 1954 |
| 2,955,805 | Jones et al. | Oct. 11, 1960 |

FOREIGN PATENTS

| 144,977 | Sweden | Apr. 27, 1954 |